(No Model.)
H. LEPLAY.
PROCESS OF AND APPARATUS FOR BARYTA OR STRONTIA TREATMENT OF SACCHARINE LIQUORS AND PRODUCTION AND RECOVERY OF THESE REAGENTS.
No. 310,448. Patented Jan. 6, 1885.
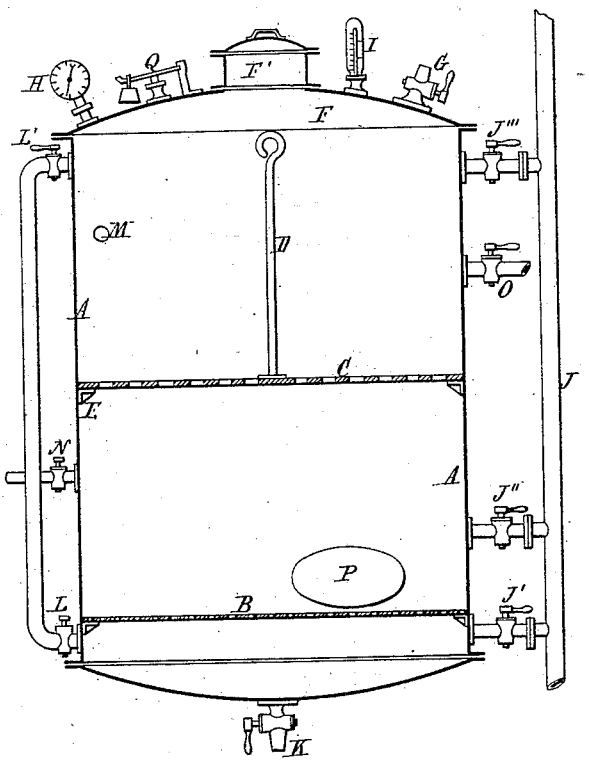
Witnesses,
Charles S. Hyer.
Robert Surett.
Inventor.
Hippolyte Leplay.
By James L. Norris,
Atty.

UNITED STATES PATENT OFFICE.

HIPPOLYTE LEPLAY, OF PARIS, FRANCE.

PROCESS OF AND APPARATUS FOR BARYTA OR STRONTIA TREATMENT OF SACCHARINE LIQUORS AND PRODUCTION AND RECOVERY OF THESE REAGENTS.

SPECIFICATION forming part of Letters Patent No. 310,448, dated January 6, 1885.

Application filed April 23, 1884. (No model.) Patented in France September 25, 1883, No. 157,732, and November 27, 1883, No. 158,818; in England September 26, 1883, No. 4,592; in Belgium December 12, 1883, No. 63,517, and in Italy December 21, 1883, XXXIII, 91.

*To all whom it may concern:*

Be it known that I, HIPPOLYTE LEPLAY, a citizen of France, residing at Paris, in the Republic of France, chemist, have invented a new and useful Process of and Apparatus for Baryta or Strontia Treatment of Saccharine Liquors, and for Production and Recovery of these Reagents, (for which I have obtained patents in France, dated September 25, 1883, No. 157,732, and dated November 27, 1883, No. 158,818; Great Britain, dated September 26, 1883, No. 4,592; Belgium, dated December 12, 1883, and Italy, dated December 21, 1883,) of which the following is a specification.

In treating saccharine liquors—such as beet-juice or molasses—with hydrates of the alkaline earths—baryta and strontia—there is considerable difficulty and loss in dealing with the large quantity of liquid resulting from the treatment, and there is great expense in providing fresh supplies of these reagents.

My invention has for its object to overcome these objections by producing and employing the reagents in the condition of low hydrates, or, as they may be termed, "monohydrates," and by recovering them, after they have effected treatment of saccharine liquor, in a condition suitable for subsequent use.

I will first describe the process and apparatus, according to my invention, for applying the monohydrate of baryta or strontia to saccharine liquor, referring to the accompanying drawing, which is a vertical section of a vessel suitable for the purpose.

A is a strong closed vessel, like a boiler, having bolted on it a cover, F, with man-hole F', safety-valve Q, pressure-gage H, and thermometer I. A steam-pipe, J, communicates with the lower and upper parts of the vessel by stop-cocks or valves J' J'' J'''. The lower and upper parts communicate by a pipe provided with stop-cocks or valves L L'. The vessel is also provided with other cocks or valves, G, for escape of air; M, for admitting the liquor; N, for decanting liquid from the precipitate; O, for admitting boiling water under pressure; K, for emptying. Near the bottom is fixed a finely-perforated screen, B, and about midway in the vessel a grating, C, is supported on an angle-iron, E, this grating having a rod, D, by which it can be lifted out when the cover is removed. P is a man-hole, for discharge of sucrate. The monohydrate is introduced through the man-hole F' in fragments, which rest on the grating C, and the saccharine juice boiling is then admitted by M in sufficient quantity to fill the lower part of the vessel and cover the grating C, so that the monohydrate becomes dissolved by it. The man-hole F' being now closed, steam is admitted by J'', to blow through the liquid, escape being open at G. When all the monohydrate is dissolved, G is closed, and the pressure is raised to several atmospheres. J'' is then closed, and in a few minutes the precipitate of sucrate of baryta or strontia subsides on the screen B. The cocks L L' are then opened, so as to equalize the pressure above and below the deposit of sucrate, and K is gradually opened, allowing the mother-liquor to escape. Then boiling water or a boiling weak solution of the alkaline earth injected by O is broken up by the screen C, and falls in a shower upon the sucrate, through which it passes, washing it. During the washing the cock K is almost closed, so as to maintain considerable pressure within the vessel. When the sucrate is sufficiently washed, the cock L is closed, and steam blown through from above effects drainage of the precipitate. The hole P is then opened, and the precipitate is raked out and transferred to a vessel to be treated with carbonic acid. It is of advantage to use monohydrate somewhat in excess, as the excess may in great part be recovered in condition of hydrate by concentration of the mother-liquor. When baryta is employed, pressure is not necessary, and therefore the vessel may be open. Strontia, however, is generally to be preferred, as it is innocuous. When the liquor to be treated is in a thick condition, such as that of molasses, it should be diluted sufficiently with water to make it freely dissolve the monohydrate.

The sucrate of baryta or strontia obtained as above described is treated in the usual way with carbonic acid, so as to precipitate carbonate of baryta or strontia from the sirup, which is separated from the carbonate by decanting and filter-pressing.

In order to produce the monohydrate from the carbonate, or to recover the monohydrate for subsequent use, the carbonate is molded into forms presenting extended surface. A very advantageous form is that of a short tube, like a drain-pipe. These molded pieces are heated in a furnace, and while hot are subjected to the action of superheated steam, which has the effect of driving off the carbonic acid, and causing the material to assume the condition of monohydrate, or low hydrate, which fuses and can be run off the furnace by a tapping-hole. This process, when applied to carbonate of baryta, presents little difficulty, but when applied to the carbonate of strontia it requires very careful adjustment of the temperature. I therefore prefer to deal with the carbonate of strontia in the following manner: I heat the molded pieces and subject them to the action of superheated steam. If the temperature somewhat exceeds that which produces monohydrate in fusion, the result is that the carbonate is converted into anhydrate, which is in the form of hard pieces. I break these pieces into fragments and mix them with crystals of ordinary hydrate of strontia, which may be that recovered from the mother-liquor and wash-liquor in the saccharine treatment above described. By the mixture of the anhydrate with the hydrate a vigorous action is set up accompanied by heat that causes considerable evaporation of water, and the result of the action is a monohydrate, or low hydrate, suitable for the treatment of fresh doses of saccharine liquor.

Having thus described the nature of my invention and the best means I know of carrying the same into practical effect, I claim—

1. The within process of obtaining sucrate of baryta or strontia, consisting in adding monohydrate or low hydrate of baryta or strontia to saccharine liquor, and dissolving the same therein to form the precipitate of the baryta or strontia, substantially as described.

2. The within process of treating saccharine liquor to obtain sucrate of baryta or strontia, consisting in bringing boiling saccharine liquor and monohydrate or low hydrate of baryta or strontia together, then blowing steam through the liquid, and subsequently, when the monohydrate has dissolved, allowing the mother-liquor to escape, then washing the precipitate thus formed, and afterward blowing steam through it to drain the same, substantially as described.

3. The within process of producing and recovering monohydrate or low hydrate of baryta or strontia, consisting in heating the carbonate of baryta or strontia, and while in that condition subjecting the carbonate to the action of superheated steam to drive off the carbonic acid, substantially as described.

4. The process herein described of producing the monohydrate or a low hydrate of strontia, said process consisting in mixing the ordinary hydrate with fragments of anhydrate produced by the action of superheated steam upon the heated carbonate of strontia, substantially as described.

5. The process herein described of producing the monohydrate or a low hydrate of strontia for use in the treatment of saccharine liquors, said process consisting in molding the carbonate of strontia into forms presenting extended surfaces, heating the molded pieces, subjecting them to the action of superheated steam, breaking said pieces into fragments, and mingling them with crystals of ordinary strontia hydrate, substantially as described.

6. The apparatus herein described and shown for the treatment of saccharine liquors by a low hydrate of baryta or strontia, said apparatus consisting of the closed vessel A, having a cover provided with a man-hole, the steam-pipe J, communicating with the upper and lower parts of the vessel, escape-valve G, inlet-valve M, decanting-valve N, hot-water valve O, and outlet K, said vessel having an inner finely-perforated screen, B, near its bottom, with a man-hole, P, above and a grating, C, midway of said vessel, substantially as described.

In testimony whereof I have signed my name to this specification, in the presence of two subscribing witnesses, this 29th day of March, A. D. 1884.

HIPPOLYTE LEPLAY.

Witnesses:
ROBT. M. HOOPER,
ARMENGAUD, Jeune.